(12) United States Patent
Halbur et al.

(10) Patent No.: US 7,591,418 B2
(45) Date of Patent: Sep. 22, 2009

(54) STORED-VALUE CARD WITH HOUSED OBJECT

(75) Inventors: Ted C. Halbur, Lino Lakes, MN (US); Travis M. Robertson, St. Louis Park, MN (US); David B. Smith, Falcon Heights, MN (US); Erin M. Borkowski, Andover, MN (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 596 days.

(21) Appl. No.: 11/404,584

(22) Filed: Apr. 14, 2006

(65) Prior Publication Data

US 2007/0241198 A1    Oct. 18, 2007

(51) Int. Cl.
*G06K 5/00* (2006.01)

(52) U.S. Cl. .................. 235/380; 235/487; 235/383

(58) Field of Classification Search ................ 235/380, 235/487, 381, 383
See application file for complete search history.

(56) References Cited

U.S. PATENT DOCUMENTS

| | | | |
|---|---|---|---|
| 3,061,572 A | 10/1962 | Packer | |
| 4,689,033 A | 8/1987 | Droller et al. | |
| 4,884,989 A | 12/1989 | Wong | |
| 5,206,494 A * | 4/1993 | Metzger | ...................... 235/487 |
| 5,253,780 A | 10/1993 | Adado | |
| 5,344,040 A | 9/1994 | Schaeppi | |
| 5,538,291 A * | 7/1996 | Gustafson | ................... 235/487 |
| 5,769,213 A | 6/1998 | Chatterton | |
| 6,017,262 A | 1/2000 | Starnes | |
| 6,045,050 A * | 4/2000 | Ippolito et al. | ............... 235/492 |
| 6,290,119 B1 | 9/2001 | Reese et al. | |
| 6,571,940 B2 | 6/2003 | Newman | |
| 6,824,066 B2 * | 11/2004 | Weyant | ....................... 235/493 |
| 7,316,357 B2 * | 1/2008 | Lindahl et al. | ............... 235/487 |
| 7,360,710 B2 * | 4/2008 | Lindahl et al. | ............... 235/487 |
| 2002/0056217 A1 * | 5/2002 | Odom et al. | .............. 40/642.02 |
| 2002/0143697 A1 | 10/2002 | Gotfried | |
| 2003/0071806 A1 | 4/2003 | Addand | |
| 2005/0087255 A1 | 4/2005 | Humphrey et al. | |
| 2005/0155618 A1 | 7/2005 | Lafferty | |

FOREIGN PATENT DOCUMENTS

GB    2 277 482 A    2/1994

OTHER PUBLICATIONS

"Frog with Sticky Tongue", J. Rousek Toy Company, Inc., www.irousek/shop/SearchResults.asp?ProdStock=1047.

* cited by examiner

*Primary Examiner*—Ahshik Kim
(74) *Attorney, Agent, or Firm*—Griffiths & Seaton PLLC

(57) ABSTRACT

A stored-value card including a housing and an object. The housing defining a storage cavity and including a door and an account identifier signifying a financial account or record linked to the stored-value card. The door is configured to transition between a closed position where the door covers an opening to the storage cavity and an open position where the opening is uncovered. The object stored within the housing is at least partially removable from the housing when the door is in the open position. Stored-value card assemblies, methods of promoting sales of stored-value cards, methods of using a stored-value card and other embodiments are also disclosed.

18 Claims, 12 Drawing Sheets

STORED-VALUE CARD WITH HOUSED OBJECT

BACKGROUND OF THE INVENTION

Stored-value cards and other financial transaction cards come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the gift card declines as the card is used, thereby, encouraging repeat visits to the retailer or other provider issuing the card. Additionally, the card generally remains in the user's purse or wallet, serving as an advertisement or reminder to revisit the associated retailer. Stored-value cards provide a number of advantages to both the consumer and the retailer.

SUMMARY OF THE INVENTION

One aspect of the present invention relates to a stored-value card including a housing and an object. The housing defines a storage cavity and includes a door and an account identifier. The account identifier signifies a financial account or record linked to the stored-value card. The door is configured to transition between a closed position where the door covers an opening to the storage cavity and an open position where the opening is uncovered. The object stored within the housing is at least partially removable from the housing when the door is in the open position. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Gift cards, financial transaction cards, or other stored-value cards are adapted for making purchases of goods and/or services e.g. a retail store or website. According to one embodiment, an original consumer buys a stored-value card to give a recipient who in turn is able to use the stored-value card at the retail store or other setting to pay for goods and/or services. A stored-value card, according to embodiments of the present invention, provides the consumer or recipient with extra amusement in addition to the ability to pay for goods and/or services with the stored-value card.

In particular, the stored-value card presents the original consumer and the recipient with a toy in addition to the financial functionality of the stored-value card. In one example, the toy is in the form of an elongated, elastomeric, sticky appendage coupled at one end to a housing of the stored-value card. Quickly rotating or flicking the housing toward a target object effectively throws a free end of the appendage toward the target object causing the appendage to elongate. Upon contact with the target object, the free end sticks or otherwise selectively adheres to the target object. The elastic nature of the appendage causes the appendage to retract to its original length, thereby, pulling the target object back toward the housing. In this manner, the appendage can be used to pick up or grab light weight items from a support surface, which, in turn, entertains the bearer of the stored-value card. In one embodiment, the presentation of the stored-value card with the appendage toy promotes the sale and/or loading of the stored-value card by potential consumers and/or other bearers of the stored-value card.

Figure 1A:
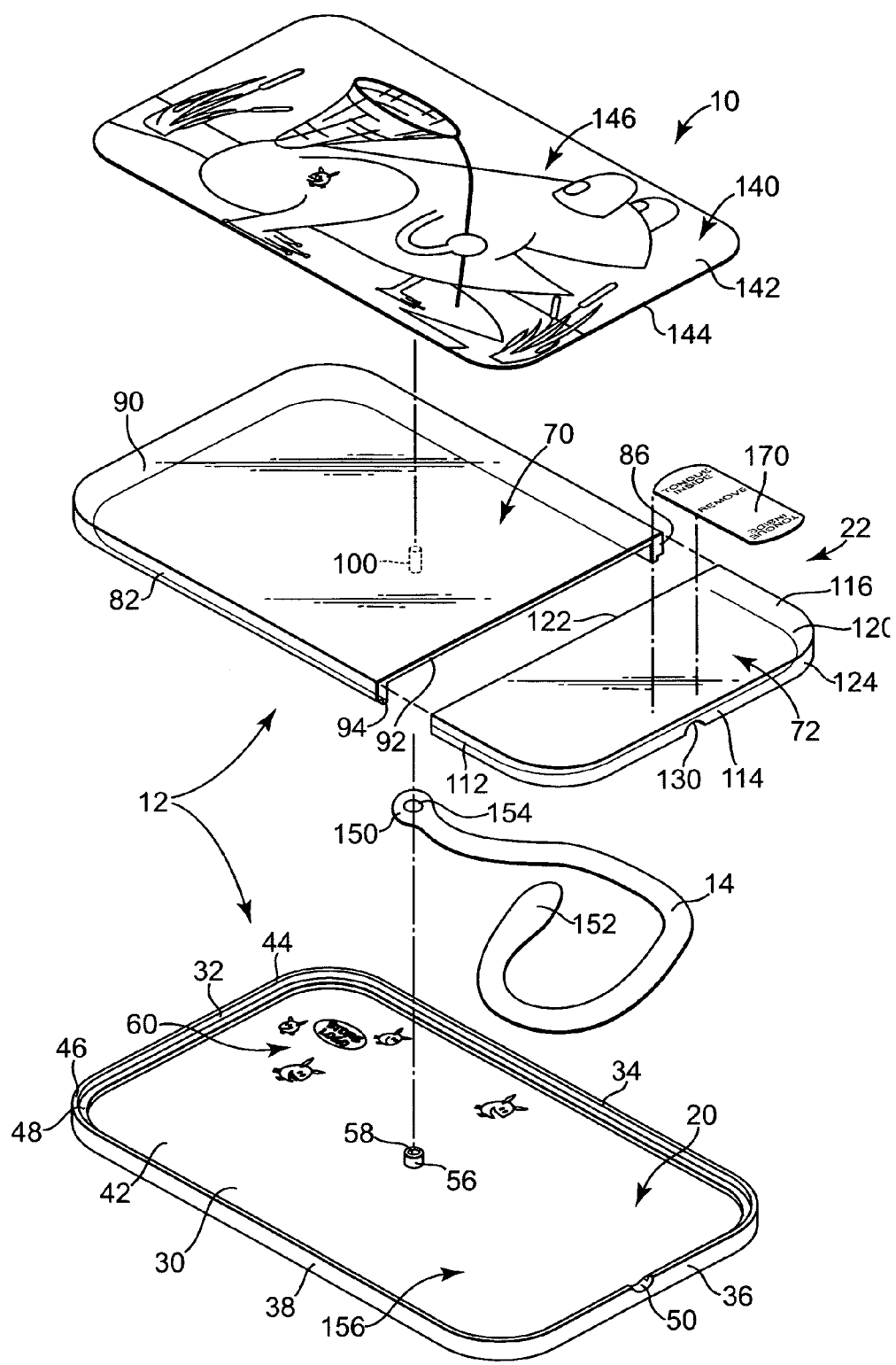
FIG. 1A is an exploded, perspective view illustration of one embodiment of a stored-value card, according to the present invention.
Figure 1B:
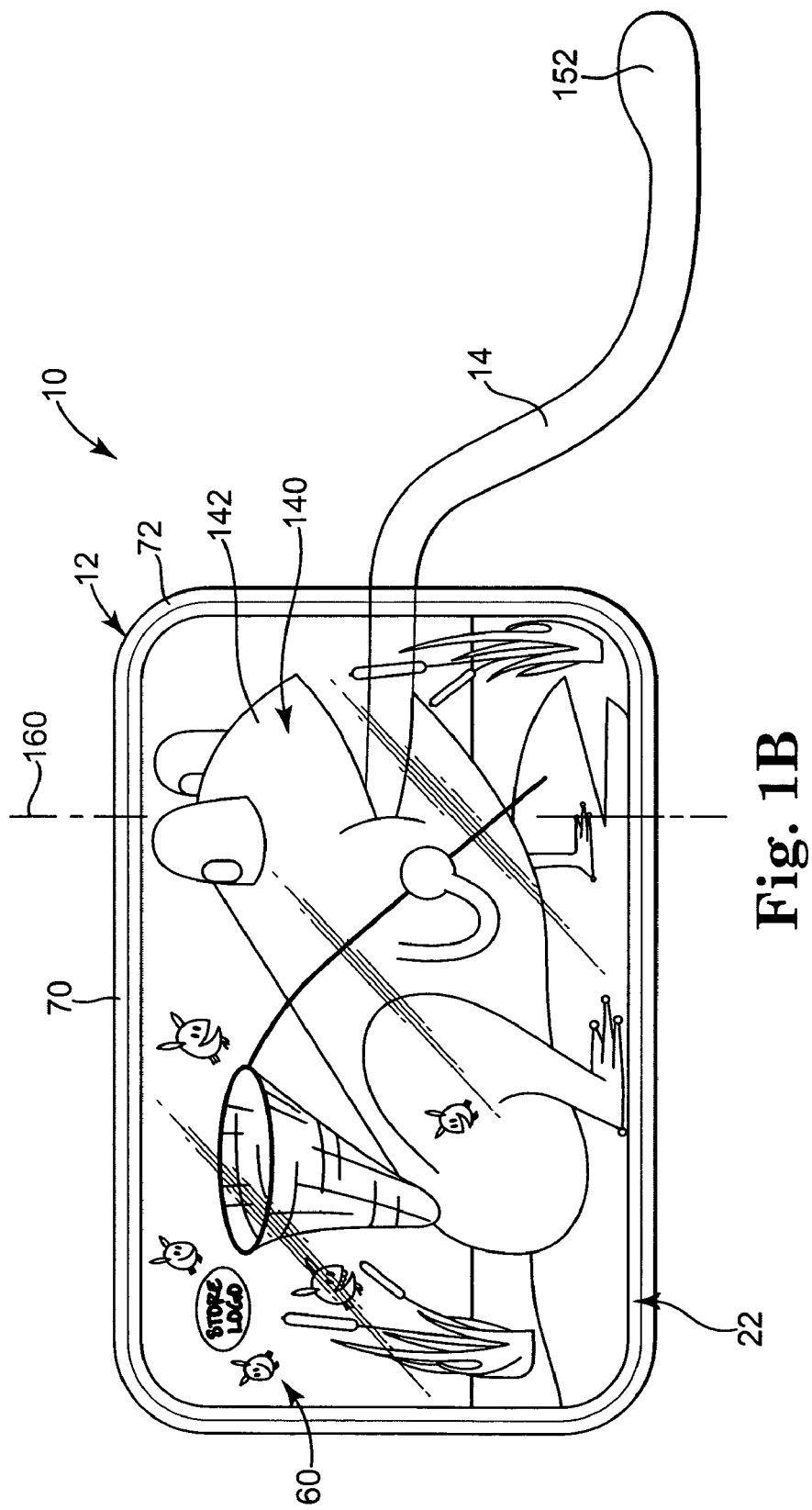
FIG. 1B is a front view illustration of the stored-value card of FIG. 1A with a door in a closed position.
Figure 1C:
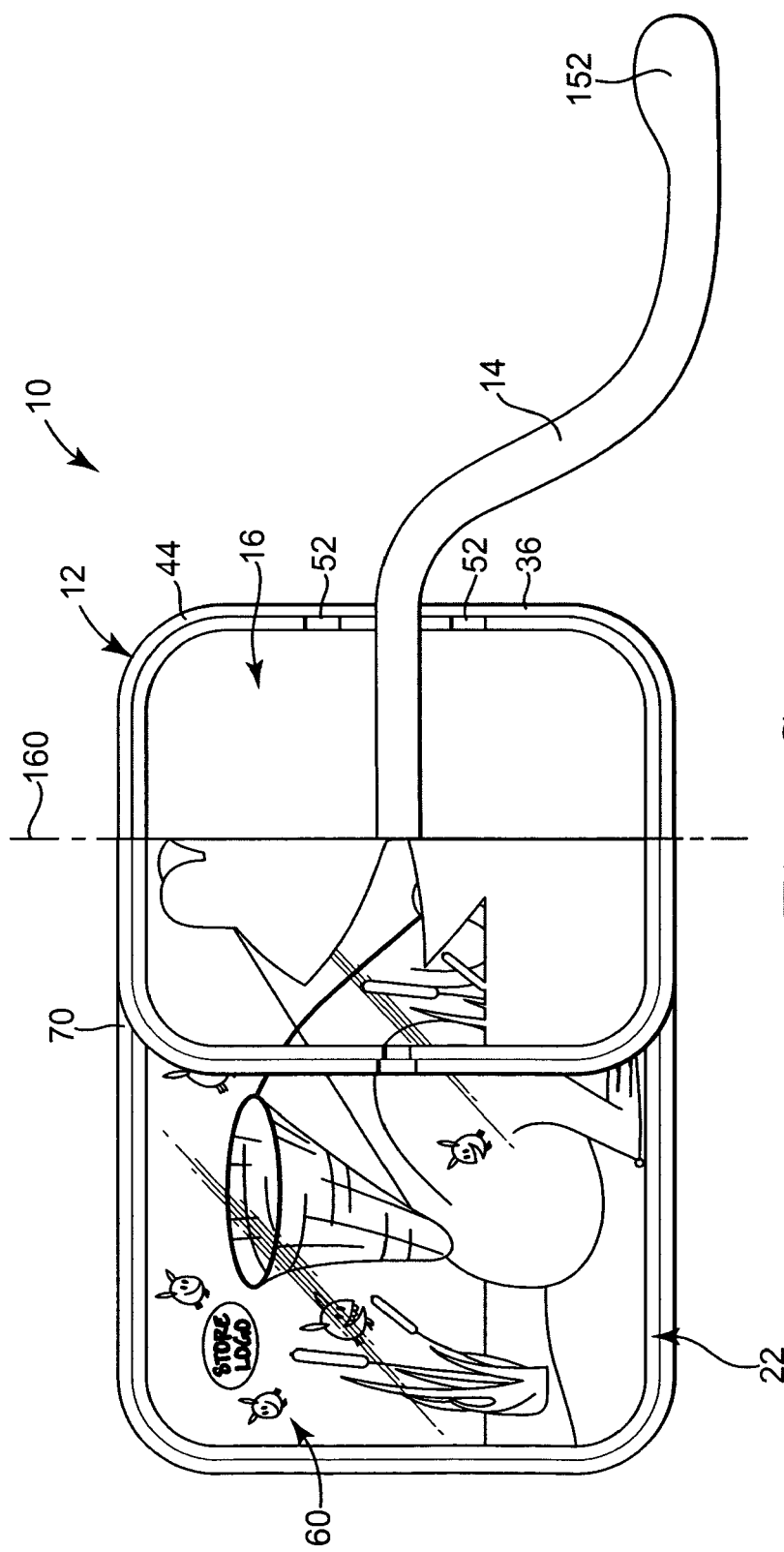
FIG. 1C is a front view illustration of the stored-value card of FIG. 1A with a door in an open position.

Turning to the figures, FIG. 1 is an exploded, top perspective view of one embodiment of a stored-value card 10 according to the present invention. Stored-value card 10 includes a housing 12 and an object 14 stored within a cavity 16 (FIG. 1C) the housing 12. Object 14 is at least partially removable from housing 12 to be played with by the bearer of stored-value card 10. Stored-value card 10, or more particularly, housing 12 is linked to a financial transaction account or record and provides a means for accessing the financial account to access monetary funds associated therewith for paying for goods and/or services.

Object 14 is a toy, an edible item(s), or other suitable item. In one embodiment, object 14 is a toy in the form of an appendage 14 stored within the housing 12. In one example, appendage 14 is coupled to housing 12. During use, appendage 14 is manipulated to at least partially extend out of the housing 12 as generally illustrated in the assembled views of FIGS. 1B and 1C. Subsequently, the appendage 14 can be used to pick up light-weight objects and to otherwise stick to various target objects, as will be further described below, thereby, amusing the bearer of stored-value card 10 and other observers. Although primarily described below as being an appendage 14, it should be understood that other toys such as playing cards, trading cards, tokens, novelty items, etc. or other items such as edible items may alternatively or additionally be stored within housing 12.

In one embodiment, housing 12 includes a base 20 and a cover 22. One embodiment of base 20 is collectively illustrated with reference to FIG. 1A, 2A and 2B. Notably, use of the terms "base" and "cover" do not refer to any particular orientation of stored-value card 10. Base 20 generally includes a primary panel 30 and side walls 32, 34, 36, and 38. Primary panel 30 is substantially planar and defines an outside surface 40 (FIG. 2A) and an inside surface 42 opposite outside surface 40. In one embodiment, primary panel 30 is substantially rectangular and sized similarly to an identification card, a credit card, or other card sized to fit in a wallet of a user. In other embodiments, primary panel 30 is shaped as a square, circle, oval, star, or another suitable shape.

Side walls 32, 34, 36, and 38 each extend from inside surface 42 away from outside surface 40 and collectively extend about the majority of the perimeter of the primary panel 30. In one embodiment, each side wall 32, 34, 36, and 38 extends with a substantially perpendicular orientation relative to primary panel 30. In particular, first side wall 32 extends substantially parallel to and is positioned opposite third side wall 36. Second side wall 34 and fourth side wall 38 each extend between first side wall 32 and third side wall 36 opposite and substantially parallel to one another.

Figure 2A:
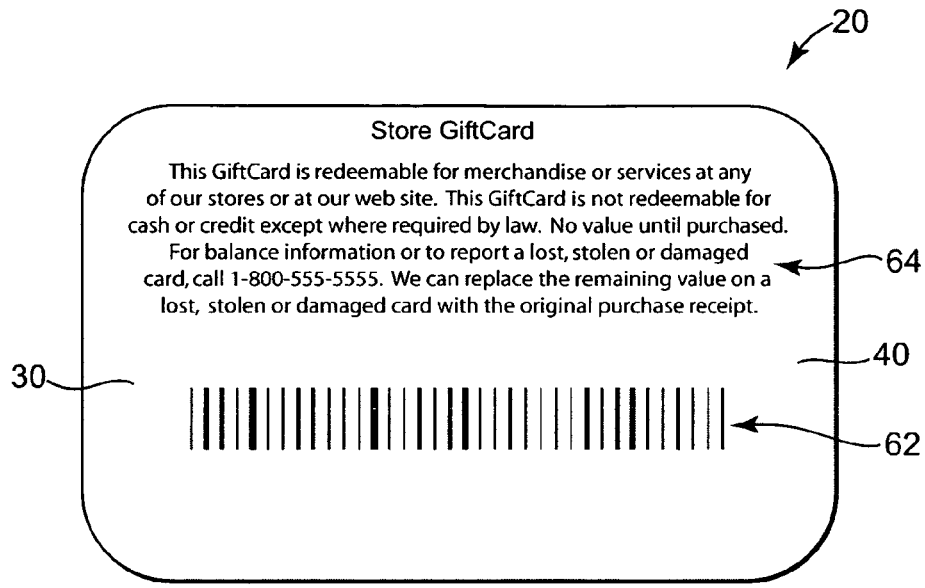
FIG. 2A is a back view illustration of one embodiment of a base of the stored-value card of FIG. 1, according to the present invention.
Figure 2B:
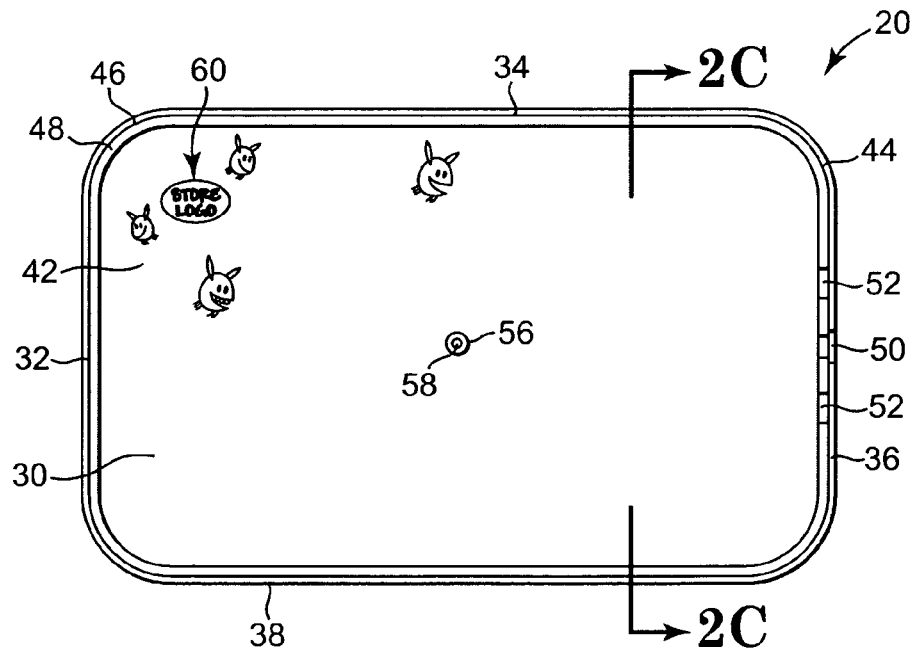
FIG. 2B is a front view illustration of the base of FIG. 2A.
Figure 2C:
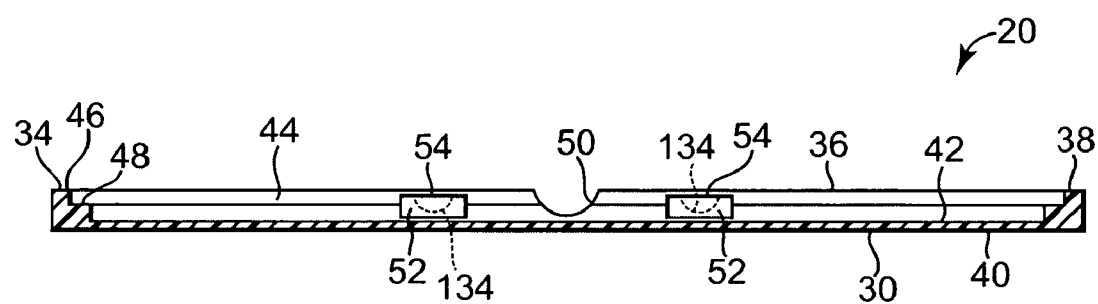
FIG. 2C is a cross-sectional view illustration of the base of FIG. 2B taken about the line 2C-2C.

Additionally referring to the top and cross-sectional view illustrations of FIGS. 2B and 2C, side walls 32, 34, 36, and 38 each extend from primary panel 30 to collectively define an inside edge 44 opposite primary panel 30. In one example, inside edge 44 is formed as a stepped edge including a first portion 46 and a second portion 48. First portion 46 extends generally about the perimeter of second portion 48 and extends from primary panel 30 a distance further than second portion 48 extends from primary panel 30. In this respect, inside edge 44 is formed as a stepped edge with the lower, second portion 48 being positioned just inside higher, first portion 46. In one embodiment, at least first portion 46 forms curved or chamfered corners at the intersection of each side wall 32, 34, 36, and 38 with another of side wall 32, 34, 36, and 38.

In one embodiment as described with reference to FIGS. 2B and 2C, second side wall 34 defines a cutout 50 extending from the inside edge 44 toward the primary panel 30. In one example, cutout 50 semi-circular in shape and is laterally centered on side wall 34. In one embodiment, two notches 52 are formed in second side wall 34. In one example, notches 52 are spaced from one another and collectively centered relative to the cutout 50. Each notch 52 extends through a portion of the thickness of first portion 46 and the entirety of the thickness of second portion 48. As such, each notch 52 is formed to have a substantially L-shaped transverse cross-section. In one embodiment, a rib 54 extends above each notch 52. More specifically, each rib 54 extends from inside edge 44 partially down and inward from first portion 46 to be adjacent a respective notch 52. Notches 52 and ribs 54 are configured to facilitate attachment of a base 20 to cover 22, as will be further described below.

In one example, a coupling feature 56 is formed by or otherwise extends from inside surface 42. In one embodiment, coupling feature 56 is substantially cylindrical and defines a cavity 58 coaxially extending therethrough. In one embodiment, coupling feature 56 is substantially centered both laterally and longitudinally on inside surface 42. Coupling feature 56 is specifically configured to maintain appendage 14 (FIG. 1A) upon assembly of stored-value card 10, as will be further described below.

In one embodiment, indicia 60 is included on inside surface 42. Indicia 60 may be printed directly to or printed to intermediate members that are subsequently adhered or otherwise secured to the inside surface 42 of the base primary panel 30. In one embodiment, the indicia 60 depicts decorative scenes, identifies a retail store or other brand, or depicts any other suitable matter.

Referring to FIG. 2A, in one embodiment, outside surface 40 of primary panel 30 includes an account identifier 62 such as a bar code, magnetic strip, smart chip or other electronic device, radio frequency identification (RFID) device, or other suitable device readily readable by a point-of-sale terminal, account access station, kiosk, or other suitable device. Account identifier 62 may be printed or otherwise disposed on outside surface 40 of base 20. Account identifier 62 indicates a financial account or record to which stored-value card 10 is linked. The account or record maintains the monetary balance on stored-value card 10 and is optionally stored on a database, other electronic or manual record-keeping system, or in the case of "smart" cards for example, on a chip or other electronic device on stored-value card 10 itself. Accordingly, by scanning account identifier 62, a financial account or record linked to stored-value card 10 is identified and can subsequently be activated, have amounts debited therefrom, and/or having amounts added thereto. In view of the above, account identifier 62 is one example of means for linking stored-value card 10 with a financial account or record.

In one embodiment, redemption indicia 64 are included on outside surface 40 of base 20. Redemption indicia 64 indicate that stored-value card 10 is redeemable for the purchase of goods and/or services, and that, upon use, a value of the purchase goods and/or services will be deducted from a financial account or record linked to stored-value card 10. In one embodiment, redemption indicia 64 includes phrases such as "<NAME OF STORE>GiftCard" and "This GiftCard is redeemable for merchandise or services at any of our stores or at our website," and/or provides help or telephone information in a case of a lost, stolen, or damaged stored-value card, etc. In one embodiment, other indicia are printed or otherwise disposed on outside surface 40 of base 20 including other objects, text, backgrounds, graphics, brand identifiers, etc. In one embodiment, account identifier 62 and/or redemption indicia 64 are alternatively included on cover 22.

In one embodiment, base 20 is formed by injection molding a plastic such as a combination of polystyrene and high-impact polystyrene or any other suitable material to define the various attributes of base 20. In one embodiment, in which base 20 is formed by injection molding, account identifier 62, redemption indicia 64, and any other suitable indicia or information are printed on the injection molded base 20. In one example, base 20 is found to be substantially rigid.

Figure 3A:
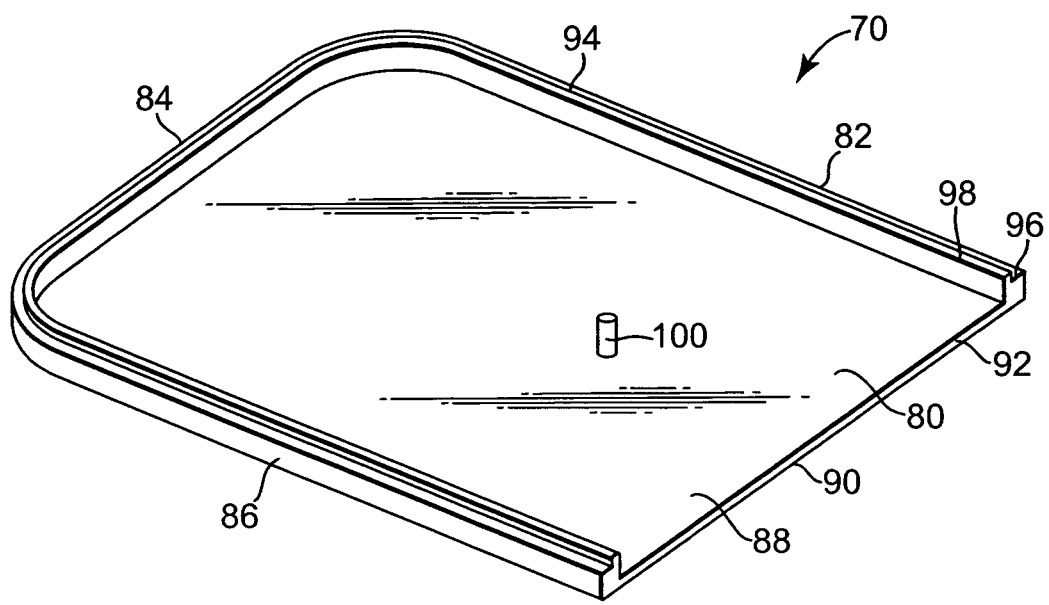
FIG. 3A is a perspective view illustration of one embodiment of a first cover member of the stored-value card of FIG. 1A, according to the present invention.

Referring to FIG. 1A, cover 22 generally includes a first cover member 70 and a second cover member 72. Cover members 70 and 72 are configured to collectively define cover 22 for interacting with base 20. Referring to FIG. 3A, in one embodiment, first cover member 70 generally includes a primary panel 80 and side walls 82, 84, and 86. Primary panel 80 is substantially planar and defines an inside surface 88 and an outside surface 90 opposite inside surface 88. Each side wall 82, 84, and 86 extends from inside surface 88, in a direction substantially perpendicular to primary panel 80 and generally about a majority of the perimeter of primary panel 80.

More specifically, where primary panel 80 is substantially rectangular, a side wall extends from three of the four sides of primary panel 80. In this respect, in one embodiment, first side wall 82 is positioned opposite and substantially parallel to third side wall 86, and second or end side wall 84, is positioned to extend between side walls 82 and 86. In this manner, a free edge 92 is defined by primary panel 80 and positioned opposite end wall 84, and no side wall 82, 84, and 86 extends from free edge 92 of primary panel 80.

In one embodiment, an inside edge 94 is collectively defined by side walls 82, 84, and 86 opposite primary panel 80. In one embodiment, inside edge 94 is a stepped edge including a first portion 96 and second portion 98. In one embodiment, first portion 96 extends from primary panel 80 a smaller distance than second portion 98 extends from primary panel 80, and first portion 96 extends around the perimeter of second portion 98. In this respect, inside edge 94 is formed as a stepped edge with a higher, second portion 98 being positioned just inside lower, first portion 96. In one embodiment, the corners of inside edge 94 and/or primary panel 80 formed at the intersections of side walls 82, 84, and 86 with another of side wall 82, 84, and 86 are rounded or chamfered.

In one embodiment, a cylindrical protrusion 100 extends from inside surface 88 of primary panel 80 in a similar direction as side walls 82, 84, and 86 extend from primary panel 80. In one example, cylindrical protrusion 100 is configured to interact with coupling feature 56 (FIG. 1A) of base 20 upon assembly of stored-value card 10. In one example, cylindrical protrusion 100 is formed with a diameter similar to or slightly smaller than a diameter of the cavity 58 (FIG. 1A) in coupling feature 56. Furthermore, protrusion 100 is positioned on primary panel 80 to align with the coupling feature 56 of base 20 upon assembly, as will be further described below.

In one embodiment, the second cover member 72 includes a primary panel 110 and side walls 112, 114, and 116. Primary panel 110 is substantially planar and generally rectangular. Primary panel 110 generally defines an inside surface 118 and an outside surface 120 (FIG. 1A) opposite inside surface 118. In one embodiment, primary panel 110 is formed with a similar thickness and width as primary panel 80.

Each side wall 112, 114, and 116 extends from inside surface 118 with an orientation substantially perpendicular to primary panel 110. Side walls 112, 114, and 116 collectively extend generally about a majority of the perimeter of primary panel 110. In one embodiment, in which primary panel 110 is substantially rectangular, side walls 112, 114, and 116 extend from three of the four side edges of primary panel 110. In particular, first side wall 112 is positioned opposite and substantially parallel to third side wall 116. Second side wall 114 extends between first side wall 112 and third side wall 116. In this manner, a free edge 122 is defined by primary panel 110 opposite second wall 114. In one example, no side wall 112, 114, and 116 extends from free edge 122.

Side walls 112, 114, and 116 extend from primary panel 110 to collectively form an inside edge 124 opposite primary panel 110. In one embodiment, inside edge 124 is a stepped edge including a first portion 126 and a second portion 128. First portion 126 extends around the outside perimeter of the second portion 128. In one embodiment, first portion 126 extends from primary panel 110 a smaller distance than second portion 128 extends from primary panel 110. In this respect, inside edge 124 is formed as a stepped edge with a higher, second portion 128 being positioned just inside lower, first portion 126. In one embodiment, the corners of at least first portion 126 of inside edge 124 formed at the intersection of side walls 112, 114, and 116 with another of side walls 112, 114, and 116 are rounded or chamfered.

In one embodiment, a cutout 130 is formed in second side wall 114. In one example, cutout 130 is semi-circular in shape and is substantially laterally centered on second side wall 114. One or more detents 132 extend from second side wall 112. In particular, in one embodiment, two detents 132 each extend from inside edge 124, in particular, from second portion 128, further away from primary panel 110. In one embodiment, two detents 132 are spaced from one another and collectively centered relative to the positioning of cutout 130 on second side wall 114. Each detent 132 includes a detent protrusion 134, which extends outwardly from the remainder of each detent 132 at least partially over the first portion 126.

With the above descriptions in mind and with reference to FIG. 1A, first cover member 70 and second cover member 72 are collectively configured to interface with and cover base 20. In one embodiment, first cover member 70 is configured to abut second cover member 72 at free edges 92 and 122 to align primary panel 80 with primary panel 110 and side walls 82 and 86 with side walls 112 and 116, respectively. More specifically, primary panels 80 and 110 are aligned with one another to collectively be sized/and shaped similar to primary panel 30 of base 20. Accordingly, side walls 112, 114, and 116 are formed to have a similar transverse cross-sectional shape as side walls 82, 84, and 86, respectively. Side walls 82 and 86 of first cover member 70 are linearly aligned with side walls 112 and 116 of second cover member 72, respectively. In one embodiment, side walls 82, 84, 86, 112, 114, and 116 collectively are formed with a similar collectively defined perimeter as side walls 32, 34, 36, and 38 of base 20.

In one embodiment, each of first cover member 70 and second cover member 72 is formed by injection molding a plastic such as polystyrene or any other suitable material to define the various attributes of cover members 70 and 72. Cover members 70 and 72 are each found to be substantially rigid. In the embodiment illustrated in FIG. 1A, 1B, cover members 70 and 72 are each substantially translucent or transparent. In one example, cover members 70 and 72 and base 20 are each formed of similar materials having a similar or identical color. In other examples, base 20 and cover 22 may be formed of different or similar materials having different coloring. For instance, in one embodiment, base 20 is opaque and colored white to best display the printed account identifier 62, redemption indicia 64, etc., while cover 22 is formed of a different color or is substantially transparent or translucent.

Second cover member 72 is configured to be movable relative to first cover member 70 such that second cover member 72 functions as a door, as will be further described below. In one embodiment, in order to allow movement of second cover member 72, relative to first cover member 70, cover members 70 and 72 are rotatably coupled to one another. In one example, cover members 70 and 72 are coupled to one another via a face panel 140.

Face panel 140 is substantially planar and is formed of paper, plastic, polyester, or other suitable material. Face panel 140 includes a first or outer surface 142 and a second or inner surface 144. Inner surface 144 is configured to adhere to outside surfaces 90 and 120 of primary panels 80 and 110. In one embodiment, face panel 140 is formed of a size sufficient to substantially extend over a majority of each of the outer side surfaces 90 and 120 of primary panels 80 and 110. In one embodiment, face panel 140 is a sticker. In other embodiments, the face panel 140 is otherwise adhered to primary panels 80 and 110. In this manner, face panel 140 couples first cover member 70 to second cover member 72.

In one embodiment, face panel 140 includes indicia 146 such as decorative indicia brand indicia, etc. In one embodiment, indicia 146 relate to a particular occasion, such as a wedding, new baby, graduation, holiday, season, brand identifier, media form identifier, birthday, or any other visual design to promote purchase of stored-value card 10. In one example, indicia 148 includes a picture or graphic referring to an animal or other character and is configured to coordinate with the visual appearance of appendage 14. Indicia 146 may alternatively or additionally identify a brand associated with a stored-value card 10, such as identifying a product brand, a store brand, etc. Other suitable combinations or selections of indicia 146 to be displayed on face panel 140 are also contemplated. In one embodiment, indicia 146 are printed on face panel 140 with acrylic resin. In one embodiment, face panel 140 is substantially transparent other than indicia 146 included thereon. Outer surface 142 of face panel 140 may be printed and finished in any suitable manner such as dull, matte, gloss, textured, or other effect finish.

Appendage 14 is generally elongated and defines a first end 150 and a second end 152 opposite the first end 150. Appendage 14 is substantially elastic such that when first end 150 of the appendage 14 is held in place and second end 152 is flicked or otherwise thrown towards a target object, appendage 14 is configured to elongate due to the resulting forces applied to appendage 14. In one embodiment, second end 152 is enlarged relative to the remainder of appendage 14 to provide additional weight to second end 152. The additional weight of second end 152 further enhances the elongation of appendage 14 due to the forces of flicking/throwing.

In one embodiment, first end 150 is substantially flattened or otherwise formed so as to define an aperture 154 extending therethrough. Aperture 154 is configured to facilitate attachment to housing 12. In one embodiment, aperture 154 is formed of a similar size as coupling feature 56. In one embodiment, appendage 14 is tacky or sticky. The tacky nature of appendage 14 allows second end 152 and/or other portions of appendage 14 to stick or otherwise adhere to target objects contacted by second end 152 when second end is flicked or thrown as described above. As such, appendage 14 is one example of means for elastically deforming and sticking to target objects. Appendage 14 is formed of any suitable material such as an elastomeric and tacky material or an elastomeric material subsequently applied with a tackifier. In one example, appendage 14 is formed of hydrogenated polybutadiene or other suitable materials.

During assembly, appendage 14 is coupled with base 20. In particular, first end 150 of appendage 14 is positioned such that aperture 154 defined therein receives coupling feature 56 of base 20. In particular, aperture 154 is sized and shaped to be positioned about the cylindrical coupling feature 56. In one embodiment, when appendage 14 is properly positioned with respect to coupling feature 56 and when placed to extend with a generally linear orientation, second end 152 extends towards, or more particularly extends over and beyond second side wall 34 as illustrated with additional reference to FIG. 1B. More specifically, in one embodiment, once appendage 14 is positioned about coupling feature 56, appendage 14 is configured to extend toward second side wall 34 and to seat at least partially within cutout 50. Notably, the deformable nature of appendage 14 allows elongated member to alternatively be placed in a serpentine configuration to be fully maintained on inside surface 42 of base 20 as generally illustrated in FIG. 1A. In an alternative embodiment, appendage 14 is placed on base 20, but may not be coupled with base 20.

Figure 3B:
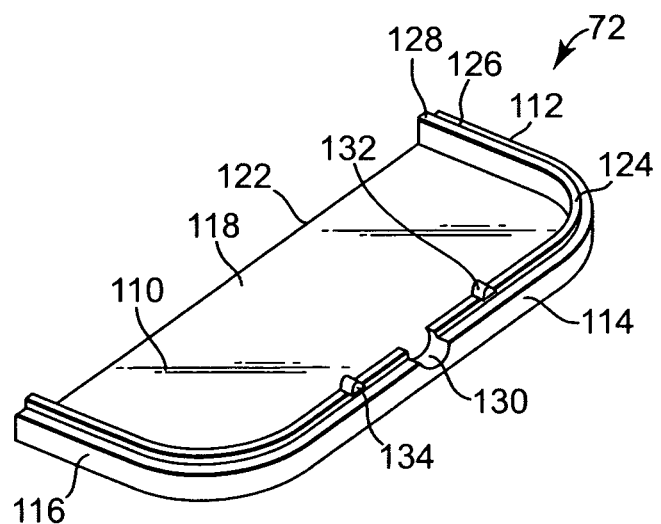
FIG. 3B is a perspective view illustration of one embodiment of a second cover member of the stored-value card of FIG. 1A, according to the present invention.

Following placement of appendage 14 relative to base 20, cover 22 is positioned over base 20. In particular, first cover member 70 is positioned such that inside edge 94 interacts with inside edge 44 of base 20. More specifically, first portion 96 and second portion 98 of inside edge 94 interface with first portion 46 and second portion 48 (FIGS. 3A and 3B) of inside edge 94, respectively. The stepped interface provides for a stable and generally neat coupling of base 20 and first cover member 70. In one embodiment, first cover member 70 is aligned with base 20 such that first side wall 82, second side wall 84, and third side wall 86 interface with a portion of first side wall 32, second side wall 34, and a portion of third side wall 36, respectively. When positioned on base 20, cylindrical protrusion 100 fits within cavity 58 of coupling feature 56. As such, in one embodiment, first end 150 of appendage 14 is secured in place between base 20 and first cover member 70. In one embodiment, an adhesive or other attachment means is applied between inside edges 44 and 94 to secure base 20 to first cover member 70. Use of other attachment means, such as attachment devices, screws, rivets, etc. is also contemplated to couple base 20 with first cover member 70.

Second cover member 72 is positioned over a remaining portion of base 20. In particular, second cover member 72 is aligned with remainder of inside edge 44 of base 20 not otherwise interfacing with first cover member 70. In particular, second cover member 72 is aligned such that inside edge 124 of first side wall 112, second side wall 114, and third side wall 116 of second cover member 72 align with inside edge 44 formed by a portion of first side wall 32, third side wall 36 and a portion of fourth side wall 38. More specifically, first portion 46 and second portion 48 of inside edge 44 interface with first portion 126 and second portion 128 of inside edge 124, respectively. The stepped interface provides for a stable and generally neat interface between base 20 and second cover member 72. In one embodiment, unlike first cover member 70, no adhesive or other attachment means is used to directly couple base 20 with second cover member 72.

Upon proper alignment of second cover member 72 with base 20, cutouts 50, 130 align with one another to collectively form a substantially circular or oval opening. Further, upon proper alignment, detents 132, in particular, detent protrusions 134, are configured to be received by notches 52 of base 20 as illustrated in broken lines in the cross-sectional illustration of FIG. 2C. More specifically, each detent protrusion 134 extends into a respective notch 52 slightly below rib 54. In this manner, second cover member 72 is selectively maintained relative to base 20. Notably, upon placement of cover members 70 and 72 on base 20, free edges 92 and 122 are laterally aligned with and abut one another. When cover members 70 and 72 are positioned on base 20 a cavity 156 (generally illustrated in FIG. 1A) is formed therebetween for receiving and storing appendage 14.

Following positioning of first cover member 70 and second cover member 72 relative to base 20, face panel 140 is applied to outside surfaces 90 and 120 of cover members 70 and 72, respectively. In this manner, face panel 140 is used to selectively couple first cover member 70 to second cover member 72. In one embodiment, face panel 140 covers a substantial portion of each outside surface 90 and 120. Accordingly, in one embodiment, in which face panel 140 and cover 22 are substantially transparent, upon assembly of cover 22, a consumer or other individual viewing stored-value card 10 can see through both face panel 140 and cover 22 to indicia 60 (FIG. 1A) or other indications on inside surface 42 of base 20. In an alternative embodiment, indicia 60 described herein to be included on face panel 140 are alternatively directly printed to cover 22, in particular, outer surfaces 90 and 120 of cover members 70 and 72. In such an embodiment, face panel 140 may be substantially transparent so as to allow a viewer to view indicia printed directly to cover 22.

Following this assembly, in one example, second cover member 72 is only permanently coupled to base 20 via face panel 140 and first cover member 70. In this manner, second cover member 72 is free to be moved relative to base 20 between a closed position as illustrated in FIG. 1B and an open position as illustrated in FIG. 1C. In particular, second cover member 72 is configured to rotate in a counterclockwise direction relative to first cover member 70 about the interface between first free edge 92 and free edge 122 as generally indicated in FIG. 1B as rotational axis 160. In this manner, second cover member 72 functions as a door and is rotated such that outside surface 120 of second cover member 72 is rotated toward outside surface 90 of first cover member 70. When rotated to an open position as described, cavity 16 and, thereby, appendage 14 are accessible from a position external to housing 12. In this manner, a recipient or other bearer of stored-value card 10 can manipulate appendage 14 to extend at least partially out of housing 12. In view of the above, second cover member 72 is one example of means for opening and closing housing 12.

More specifically, in one embodiment, appendage 14 is positioned to extend from first end 150 and to be seated within cutout 50. Once appendage 14 is so positioned, second cover member 72 is rotated in the clockwise direction to close housing 12 and to sandwich appendage 14 between and within base cutouts 50 and 130. Second cover member 72 is maintained in a closed position due to the interaction between detents 132, more particularly, interaction of detent protrusion 134 with notches 52 and ribs 54. More specifically, during rotation of the second cover member 72 to the closed position, detents 132 deform slightly inward to move detent protrusions 134 inward and over ribs 54 and into notches 52. Once closed, detents 132 return to their original position, thereby, pushing detent protrusions 134 into notches 52. Due to interaction between detent protrusions 134 and ribs 54, housing 12 is maintained in a closed position.

In one embodiment, when appendage 14 extends from the closed housing 12 via cutouts 50, 130, the position of the appendage 14 corresponds with a character or animal on represented by indicia 146 such that appendage 14 appears as a portion of the character or animal. For example, in one embodiment, decorative indicia 146 depicts a frog or other animal and appendage 14 is positioned so as to appear to be a tongue, arm, leg, or other appendage of the animal depicted by indicia 146. As such, indicia 146 is one example of means for visually representing appendage 14 as an appendage of a character or animal.

In addition, when appendage 14 extends from housing 12, appendage 14 is positioned to be flicked or otherwise thrown toward a particular object. In particular, a bearer of stored-value card 10, gripping stored value-card 10, is able to flick, for example to rapidly rotate his/her wrist, and thereby, stored-value card 10, toward an object or other member desired to be contacted by appendage 14. By rapidly rotating stored-value card 10, centripetal and velocity forces acting on appendage 14 cause appendage 14 to elongate. During elongation of appendage 14, ideally, second end 152 of appendage 14 contacts the target object or member.

Due to the tacky nature of appendage 14, second end 152 may stick or otherwise selectively adhere to the object or target member. When the flicking forces dissipate, appendage 14 returns to its original length and, thereby, the target object is also moved back toward housing 12 and the bearer of stored-value card 10. As such, the bearer of stored-value card 10 and other observers are entertained. Flicking of the stored-value card 10 can be repeated as necessary and as desired by the user for their amusement. In an alternative embodiment, where appendage 14 is not coupled with housing 12, second cover member 72 is opened and appendage 14 or other toy is entirely removable from housing 12 during use of appendage 14 for entertainment purposes.

Following use, appendage 14 is replaced and stored with housing 12. More specifically, second cover member 72 is rotated in a counter-clockwise direction about axis 160 (FIG. 1B) to open housing 12. When opened, appendage 14 is bent or otherwise manipulated as necessary to position appendage 14 fully within housing 12. Following this positioning of appendage 14, second cover member 72 is rotated about axis 160 in a clockwise direction to close housing 12 and to position detent protrusions 134 within notches 52 to maintain second cover member 72 in a closed position. As such, detents 132, notches 52, and ribs 54 collectively define a latch mechanism of housing 12. When in a closed position, appendage 14 is fully maintained within housing 12. Accordingly, housing 12 is one example of means for substantially enclosing appendage 14. The enclosure of appendage 14 is desired to protect appendage 14 from environmental factors. In particular, due to the tacky nature of appendage 14, enclosure within housing 12 prevents dust or other undesired debris from sticking or otherwise being attracted to appendage 14. By preventing undesired materials from sticking to appendage 14, appendage 14 is able to maintain its tackiness for a longer duration, thereby, increasing the life span of appendage 14.

As illustrated in FIG. 1A, in one embodiment, stored-value card 10 additionally includes a sticker 170. Sticker 170 is configured to be applied to second cover member 72 and base 20 to maintain second cover member 72 in a closed position relative to base 20 in a more robust manner. In this fashion, sticker 170 holds second cover member 72 closed in a manner configured to withstand the rigors of transport, etc. such that detents 132 and detent protrusions 134 do not break off or otherwise damage prior to purchase of stored-value card 10 by a consumer. In addition, sticker 170 prevents or decreases the occurrence of consumers playing with stored-value card 10 in the retail setting without purchasing stored-value card 10. In one embodiment, sticker 170 is positioned on housing 12 to cover cutouts 50 and 130 to additionally prevent undesired materials from entering housing 12 through cutouts 50 and 130 and contacting appendage 14. In one embodiment, sticker 170 includes indicia or other instructions telling a user to remove and dispose of sticker 170 prior to use of stored-value card 10 for entertainment purposes.

Figure 4A:
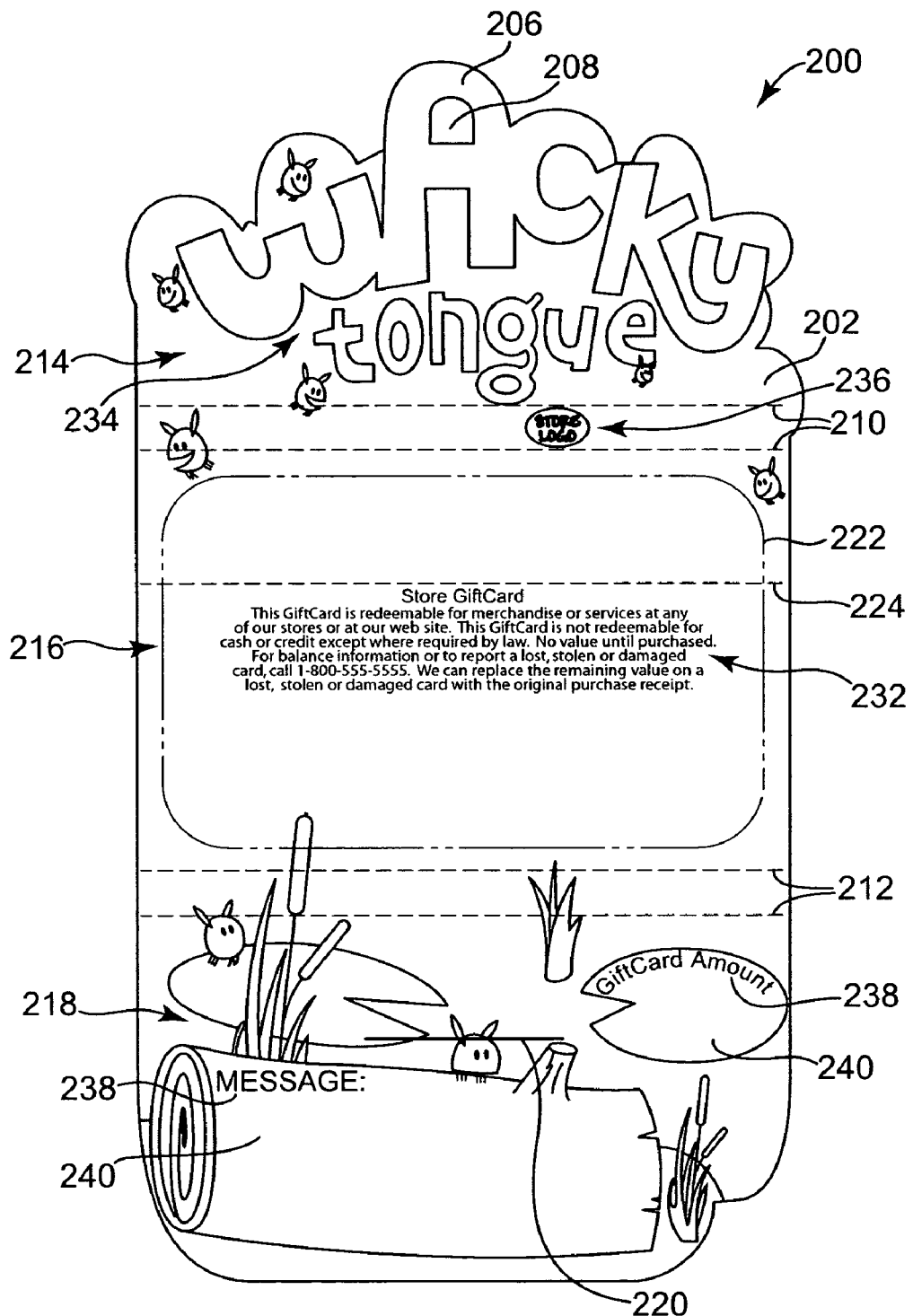
FIG. 4A is a front view illustration of one embodiment of an unfolded carrier for supporting a stored-value card, according to the present invention.
Figure 4B:
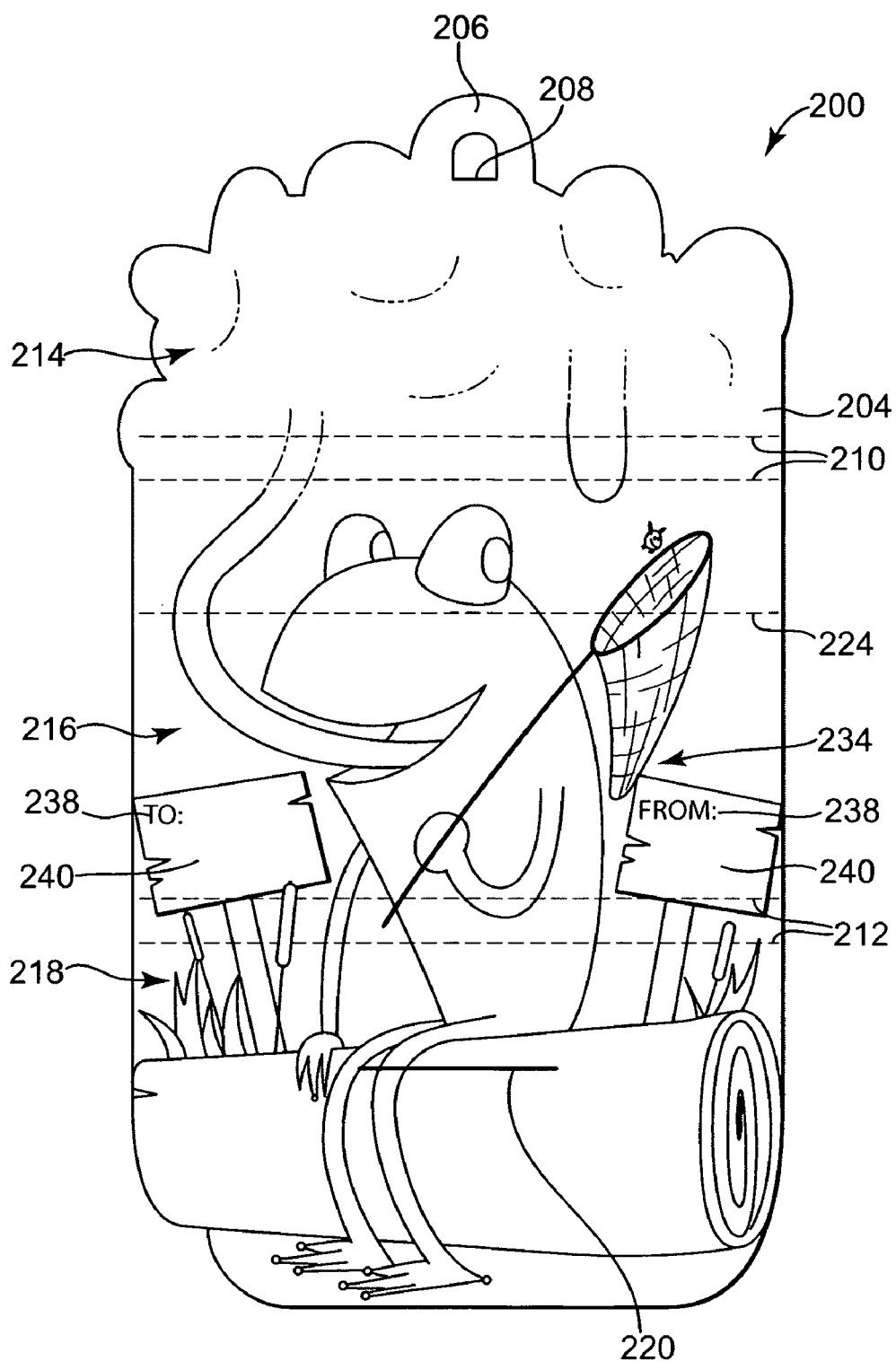
FIG. 4B is a back view illustration of the unfolded carrier of FIG. 4A.

FIGS. 4A and 4B illustrate a carrier or backer 200 for supporting stored-value card 10 in an unfolded or open configuration. Backer 200 comprises a single layer or multiple layers of paper or plastic material, for example, substantially in the form of a relatively stiff but bendable/flexible card. Use of other materials is also contemplated. In one embodiment, backer 200 is a substantially planar substrate having a substantially elongated or generally rectangular shape. Accordingly, backer 200 defines a first surface 202 (FIG. 4A) and a second surface 204 (FIG. 4B) opposite first surface 202. A tab 206 is substantially centered at a first lateral end of backer 200. In one example, a support arm aperture 208 is defined within tab 206 and is configured to receive a support arm or hook. As such, an open backer 200 can be hung on the support arm or hook for display in a retail store. Backer 200 may additionally include any number of cutouts or be formed of any other suitable shape as desired to achieve a particular visual effect or to otherwise enhance the function of backer 200.

Fold lines 210 and 212 each extend laterally across backer 200 and are spaced longitudinally from one another. More specifically, fold lines 210 are positioned relatively near tab 206 as compared to fold lines 212. A first panel 214, a second or intermediate panel 216, and a third panel 218 are defined by the position of fold lines 210 and 212. First panel 214 extends from fold lines 210 away from fold line 212 and includes tab 206. Second or intermediate panel 216 extends between fold lines 210 and 212. Third panel 218 extends from fold lines 212 in a direction opposite fold lines 210. A laterally extending slit 220 is laterally centered on third panel 218.

First surface 202 of intermediate panel 216 is configured to receive and maintain stored-value card 10 (FIG. 1A) as generally indicated by broken line 222. In one example, stored-value card 10 is adhered to intermediate panel 216 and is longitudinally and laterally centered on intermediate panel 216. In one embodiment, backer 200 additionally includes a fold line 224 laterally extending across intermediate panel 216.

In one embodiment, backer 200 displays additional indicia, graphics or text information including store logo(s), store name(s), slogans, advertising, instructions, directions, brand indicia, promotional information, media format identifiers (e.g. characters, logos, scenes, or other illustrations relating to at least one of a movie, television show, book, etc.), characters, and/or other information. For example, first surface 202 includes indicia 232, 234, 236 and/or 238.

Indicia 232 indicate that stored-value card 10 is redeemable for the purchase of goods and/or services and that, upon use, a value of the purchased goods and/or services will be deducted from the financial account or record linked to stored-value card 10. In one embodiment, indicia 232 include phrases such as "<NAME OF STORE>GiftCard" and "This GiftCard is redeemable for merchandise or services at any of our stores or at our website," and/or provides help or phone line information in case of a lost, stolen, or damaged stored-value card 10, etc.

Indicia 234 are decorative indicia that generally improve the aesthetic appeal of backer 200. In one embodiment, decorative indicia 234 are positioned and configured to correspond with decorative indicia 136 of stored-value card 10. In one example, decorative indicia 234 additionally or alternatively include a printed text or character reference to the appendage 14 (FIG. 1A) of stored-value card 10. Indicia 236 identify a store, brand, department, media title or logo, e.g. a title or logo of a move, book television show, video game, etc. associated with stored-value card 10, etc. In one embodiment, indicia 236 are additionally or alternatively included on first surface 202 and second surface 204 of backer 200.

Indicia 238 instruct or otherwise inform a card bearer to write items of interest in associated fields 240. In one embodiment, indicia 238 includes the text "To," "From," "GiftCard Amount," and/or "Message" each being associated with a field 240 designated to be written on by user with a pen, pencil, marker, etc. Additional information besides that specifically described and illustrated herein may also be included. Any of indicia 232, 234, 236, 238, or other indicia, optionally may appear anywhere on backer 200 or stored-value card 10.

Figure 5:
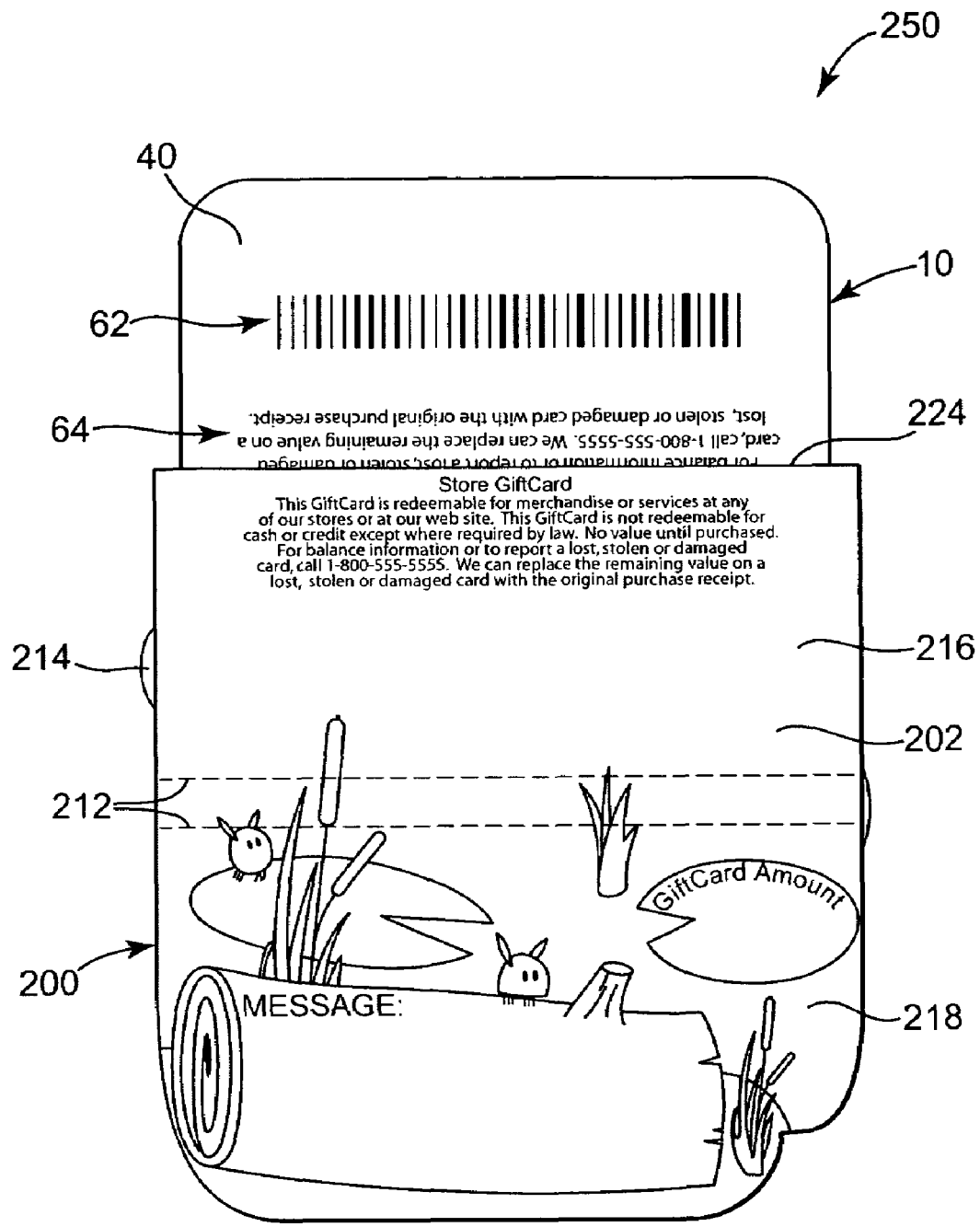
FIG. 5 is a back view illustration of one embodiment of the folded carrier of FIG. 4A supporting a stored-value card, according to the present invention.

Backer 200 is configured to receive stored-value card 10 on first surface 202 of intermediate panel 216 as illustrated with broken line 224 in FIG. 4A. In particular, stored-value card 10 is releasably adhered or otherwise secured to intermediate panel 216. Stored-value card 10 and backer 200 collectively define a stored-value card assembly 250 as illustrated in FIG. 5. In one embodiment, backer 200 is hung from a support arm or hook via aperture 208 for display in a retail setting in a manner in which at least stored-value card 10 and a portion of first surface 202 of backer 200 is visible to potential consumers.

During purchase, third panel 218 and an adjacent portion of intermediate panel 216 are folded back about fold line 224 as illustrated in FIG. 5 to expose a portion of outside surface 40 of stored-value card 10. In particular, the exposed portion of outside surface 40 includes account identifier 62. As previously described, account identifier 62 is adapted for accessing a financial account or record associated with stored-value card 10 for activating, loading, or debiting from the account or record. Accordingly, by folding backer 200 about fold line 224, account identifier 62 is accessible to activate and/or load stored-value card 10 without removing stored-value card 10 from backer 200.

Backer 200 is configured such that after purchase first panel 214 and third panel 218 are foldable about fold lines 210 and 212, respectively, to enclose or selectively wrap stored-value card 10 as desired. More particularly, third panel 218 is rotated about fold lines 212 so that first surface 202 of third panel 218 is moved towards first surface 202 of intermediate panel 216. Then, first panel 214 is rotated about fold lines 210 so that first surface 202 of first panel 214 is moved toward first surface 202 of intermediate panel 216. In this respect, first panel 214 at least partially overlaps third panel 218. Tab 206 is slid into slit 220 of third panel 218 to selectively maintain backer 200 in a folded or closed position (not shown) about stored-value card 10. Folding of first and third panels 214 and 218 of backer 200 in the opposite directions about fold lines 210 and 212 for display in a retail store is also contemplated.

When in the folded position, stored-value card 10 is effectively wrapped for presentation to a recipient of stored-value card 10. Upon receipt, the recipient unfolds backer 200 to access stored-value card 10. Once accessed, recipient or other bearer can use stored-value card 10 as a toy or as tender in financial transactions. Backers similar to backer 200 can be used with various sizes and shapes of stored-value cards 10. Other backers or packages are also contemplated for supporting and/or substantially enclosing stored-value card 10. In one embodiment, stored-value card 10 is displayed and sold without backer 200.

Figure 6:
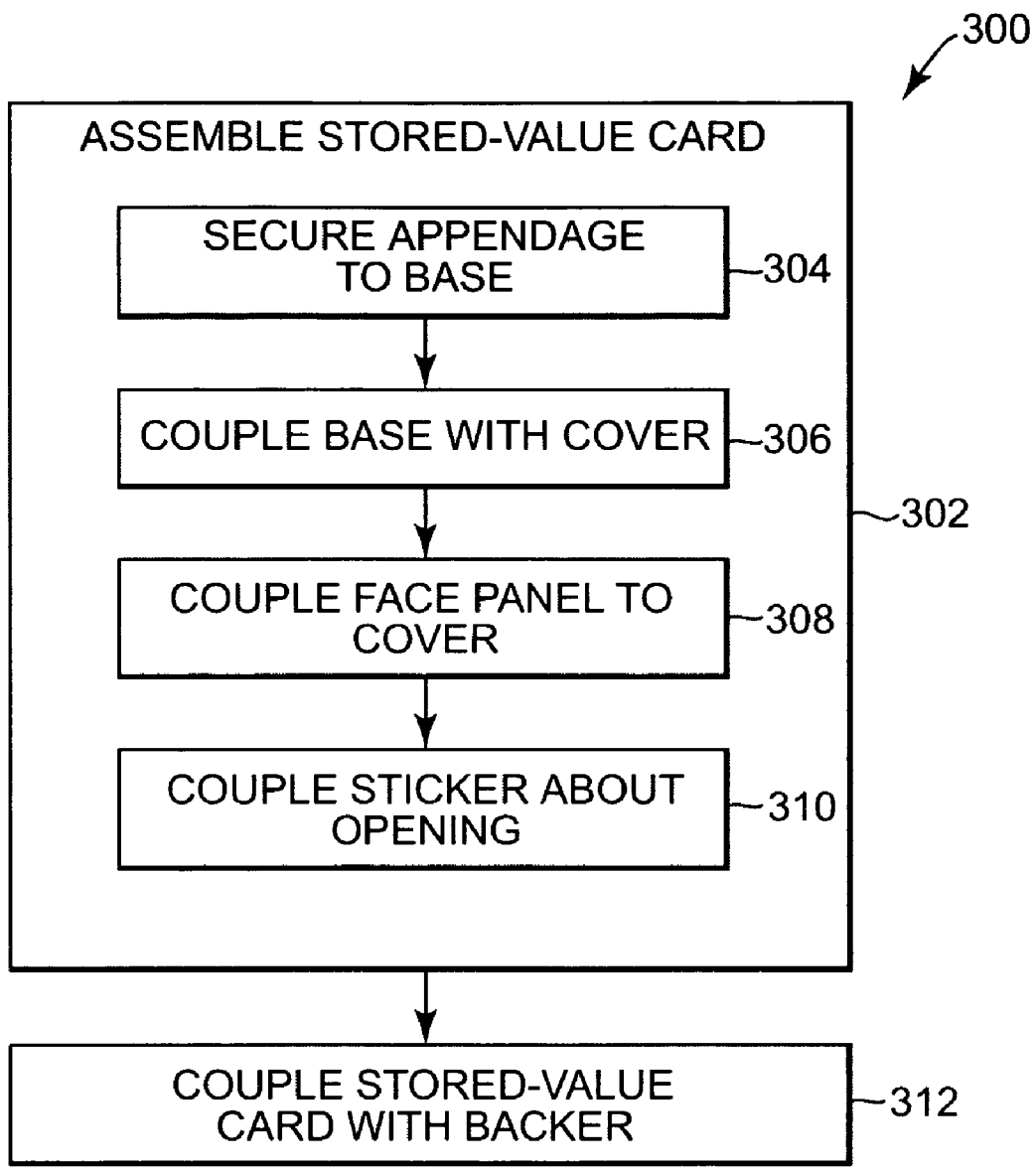
FIG. 6 is a flow chart illustrating one embodiment of a method of assembling a stored-value card, according to the present invention.

FIG. 6 is a flow chart illustrating one embodiment of a method 300 of assembling stored-value card 10 with backer 200. Additionally referring to FIG. 1A, at 302, stored-value card 10 is assembled. In particular, at 304, appendage 14 is secured to base 20 by placing first end 150 of appendage 14 such that aperture 154 in first end 150 receives coupling feature 56 of base. In one embodiment, at 306, base 20 is coupled with cover 22. More specifically, first cover member 70 is coupled with base 20 by interfacing and adhering a portion of inside edge 44 of base 20 with inside edge 94 of first cover member 70. Second cover member 72 is coupled with base 20 by interfacing a portion of inside edge 44 of base 20 with inside edge 124 of second cover member 72 and by placing detent protrusions 134 of second cover member 72 to be received by notches 52.

At 308, face panel 140 is coupled to cover 22. More specifically, face panel 140 is adhered to outside surfaces 90 and 120 of first and second cover members 70 and 72. In one example, face panel 140 is coupled to cover 22 prior to coupling base 20 with cover 22 at 306. At 310, sticker 170 is adhered to housing 12 about cutouts 50 and 130. In particular, in one embodiment, appendage 14 is positioned fully within housing 12, second cover member 72 is closed, and sticker 170 is adhered to base 20 and to cover 22 over cutouts 50 and 130. In one example, sticker 170 is selectively adhered to housing 12, such that a bearer of stored-value card 10 can subsequently remove sticker 170 to open housing 12 and to access appendage 14 or to otherwise interact with stored-value card 10 for entertainment purposes.

At 312, the assembled stored-value card 10 is coupled with backer 200 to collectively form stored-value card assembly 250. In one example, stored-value card 10 is coupled to backer 200 with an adhesive or other selectively releasable material or device. In one embodiment, backer 200 is folded into a folded position for shipment and/or display to retail settings. Backer 200 is, more specifically, folded by folding backer 200 about fold lines 210 to mate the backer surfaces illustrated in FIG. 4B. As such, a portion of backer 200 with stored-value card 10 is visible from one side of folded backer 200. Backer 200 can also be folded in the opposite direction about fold lines 210 to substantially enclosed stored-value card 10. In one embodiment, backer 200 is displayed in an unfolded position hung from a support arm via support arm aperture 208.

Figure 7:
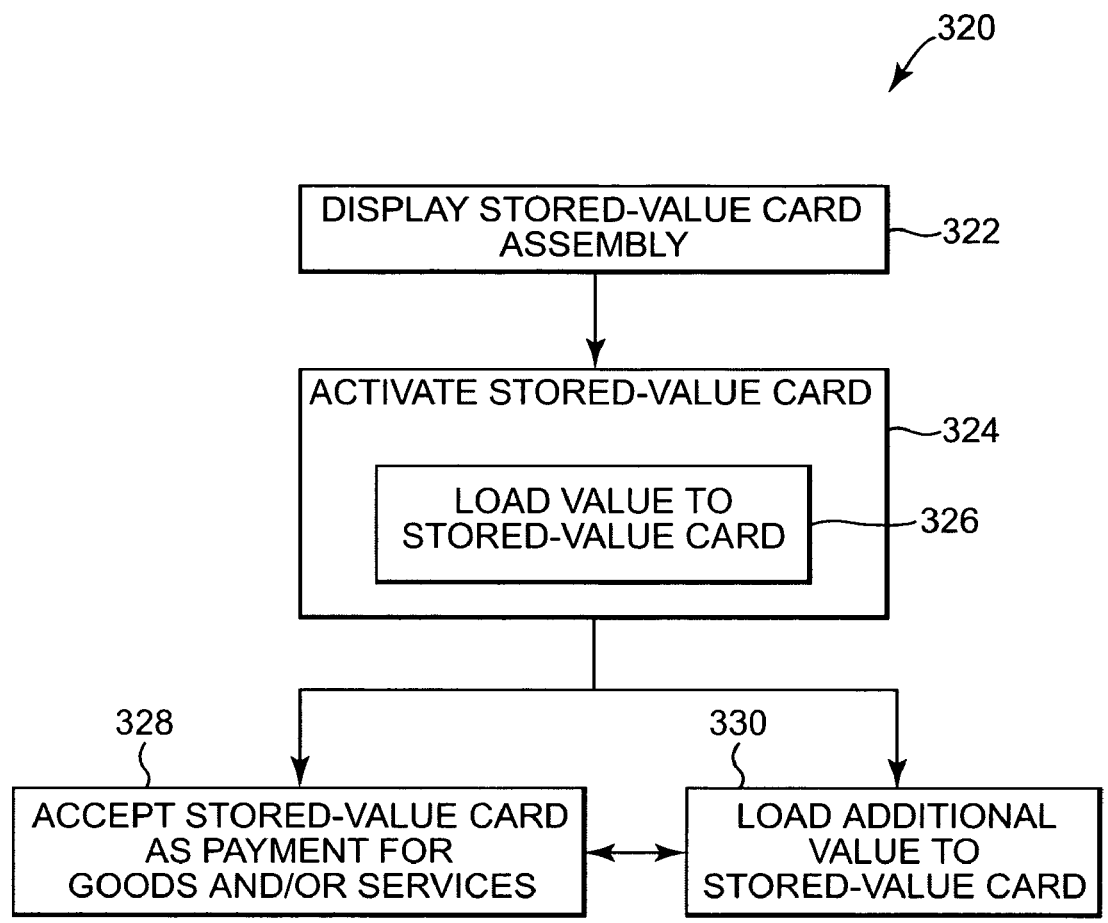
FIG. 7 is a flow chart illustrating one embodiment of a method of providing a stored-value card, according to the present invention.

FIG. 7 is a flow chart illustrating one embodiment of a method 320 of providing stored-value card assembly 250 for sale to and use by consumers. At 322, stored-value card assembly 250 is placed or hung from a rack, shelf, or similar device to display stored-value card assembly 250 for sale to potential consumers. In one example, stored-value card assembly 250 is placed for sale such that stored-value card 10 is visible to potential consumers. In one embodiment, a depiction of stored-value card assembly 250 is placed on a website for viewing and purchase by potential consumers. In one embodiment, stored-value card 10 is displayed without backer 200.

At 324, a consumer, who has decided to purchase stored-value card 10, presents the stored-value card assembly 250, or at least stored-value card 10, to a retail store employee, retail store kiosk, or other person or device to fold backer 200, if necessary, and to scan account identifier 62 of stored-value card 10 to access the financial account or record linked to account identifier 62. Upon accessing the financial account or record, at 326, the account or record is accessed and value is added to the financial account or record. Thus, stored-value card 10 is activated and loaded. Once stored-value card 10 is activated and loaded, stored-value card 10 can be used by the consumer or any other bearer of stored-value card 10 to purchase goods and/or services at the retail store or other affiliated retail setting or website.

At 328, the retail store or other affiliated retail setting or website accepts stored-value card 10 as payment towards the purchase of goods and/or services made by the current bearer of stored-value card 10. In particular, the value currently loaded on stored-value card 10 is applied towards the purchase of goods and/or services. At 330, additional value is optionally loaded on stored-value card 10 at a point-of-sale terminal, kiosk, or other area of the retail store or related setting. Upon accepting stored-value card 10 as payment at 328, the retail store or related setting can subsequently perform either operation 328 again or operation 330 as requested by a current bearer of stored-value card 10. Similarly, upon loading additional value to stored-value card 10 at 330, the retail store or related setting can subsequently perform either operation 330 again or operation 328. In one example, the ability to accept stored-value card 10 as payment for goods and/or services is limited by whether the financial account or record associated with stored-value card 10 has any value at the time of attempted redemption.

Figure 8:
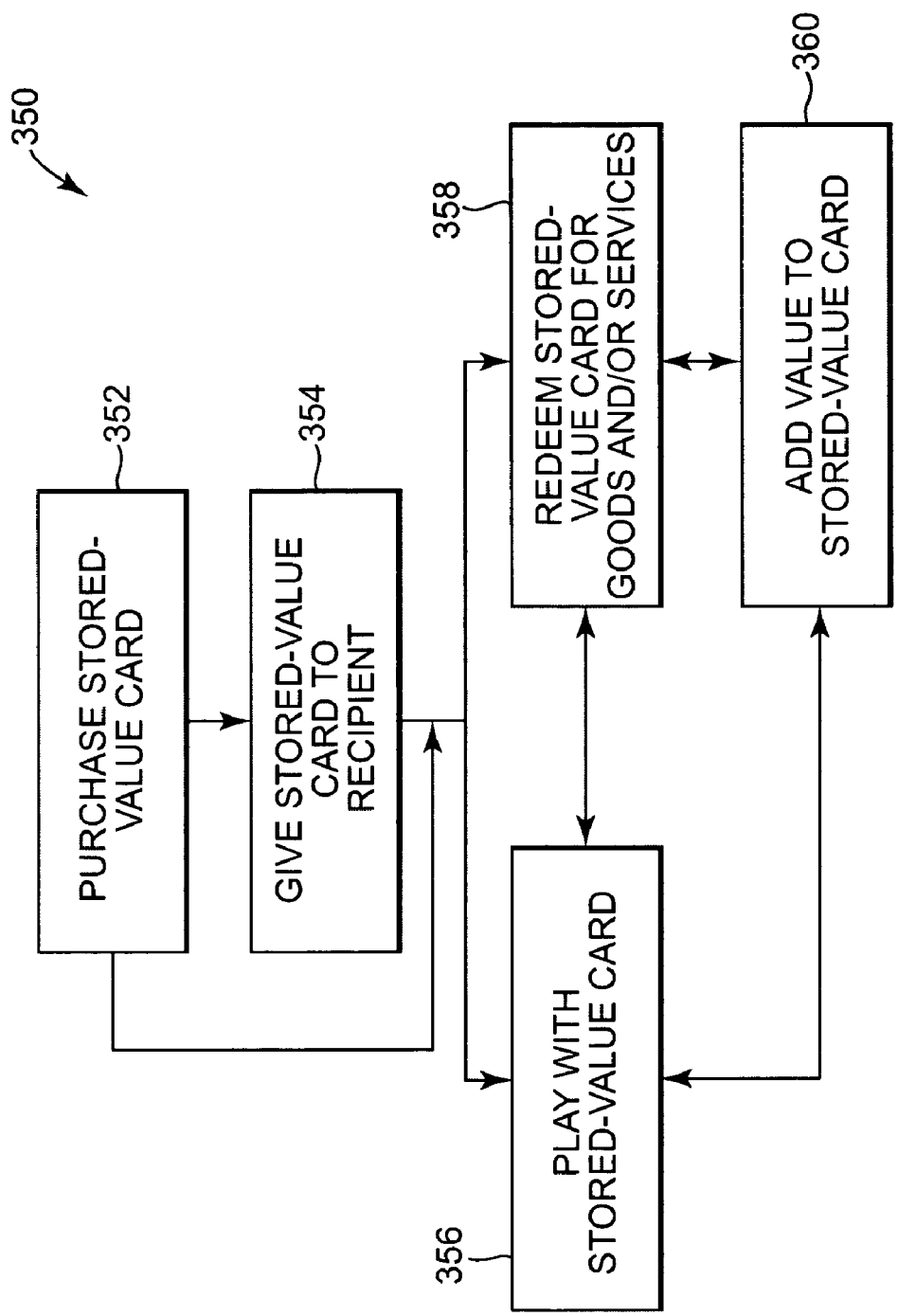
FIG. 8 is a flow chart illustrating one embodiment of a method of using a stored-value card, according to the present invention.

FIG. 8 is a flow chart illustrating one embodiment of a method 350 of using stored-value card 10. At 352, a potential consumer of stored-value card 10, which is displayed in a retail store or viewed on a website, decides to and does purchase stored-value card 10 from the retail store or website setting. Stored-value card 10 can be displayed and purchased alone or as part of stored-value card assembly 250. Upon purchasing of stored-value card 10, a retail store employee, retail store kiosk, or other person or device folds backer 200 to reveal account identifier 62. Account identifier 62 is scanned to access the financial account or record linked to account identifier 62 and to thereby activate or load value onto stored-value card 10.

At 354, the consumer optionally gives stored-value card 10 to a recipient, such as a graduate, relative, friend, expectant parents, one having a recent or impending birthday, a couple having a recent or impending anniversary, etc. As an alternative, the consumer can keep stored-value card 10 for his or her own use.

At 356, the consumer or recipient, whoever is in current ownership or otherwise is the current bearer of stored-value card 10, plays with stored-value card 10. More specifically, the bearer removes stored-value card 10 from backer 200 if stored-value card 10 is coupled with backer 200 and removes sticker 170 from housing 12. The bearer opens housing 12 by rotating second cover member 72 and interacts with appendage 14 or otherwise plays with stored-value card 10 for entertainment purposes.

More specifically, in one embodiment, the appendage 14 is positioned to at least partially extend out of housing 12. The housing 12 is subsequently flicked or otherwise moved causing the second end 152 of appendage 14 to move away from first end 150 thereby elongating appendage 14. The enlarged second end 152 enhances the distance and speed at which second end 152 travels away from first end due to the various forces induced by flicking housing 12. In one embodiment, the bearer of stored-value card 10 flicks housing 12 toward a relatively lightweight object to be picked up from the floor or other support surface. When and if second end 152 contacts the object, the tacky nature of appendage 14 causes second end 152 to temporarily adhere to the object thereby picking the object up from the support surface.

When, due to the elastic nature of appendage 14, appendage 14 retracts to its original length, second end 152 moves back to the bearer of stored-value card 10 with the picked object, which in turn generally amuses the bearer of stored-value card 10 and any observers. Stored-value card 10 can be repeatedly played with as described above as long as appendage 14 remains sufficiently tacky to grasp objects. It is contemplated that stored-value card 10 can be otherwise manipulated to amuse the bearer.

In one embodiment, following playing with stored-value card 10, appendage 14 is bent or manipulated into a serpentine configuration to position appendage 14 fully within housing 12, and second cover member 72 is closed. Accordingly, appendage 14 is at least partially protected from airborne debris or other contaminates that would otherwise serve to prematurely decrease the tackiness of appendage 14. In this respect, the lifespan of appendage 14 is increased.

At 358, the current bearer of stored-value card 10 redeems stored-value card 10 for goods and/or services from the retail store or website. At 360, the current bearer of stored-value card 10 optionally adds value to stored-value card 10, and more particularly, to the financial account or financial record associated with stored-value card 10, at the retail store or over the Internet. Upon playing with stored-value card 10 at 356, redeeming stored-value card 10 at 358, or adding value to stored-value card 10 at 360, the current bearer of stored-value card 10 subsequently can perform any of operations 356, 358, or 360 as desired. In one embodiment, the ability of the current bearer to repeat redeeming stored-value card 10 at 358 is limited by whether the financial account or record associated with stored-value card 10 has any value at the time of attempted redemption.

Although described above as occurring at single retail store or website, in one embodiment, purchasing stored-value card 10 at 352, redeeming stored-value card 10 at 358, and adding value to stored-value card 10 at 360, can each be performed at any one of a number of stores adapted to accept stored-value card 10 or over the Internet. In one example, the number of stores are each a part of a chain or similarly branded stores. In one example, the number of stores includes at least one website and/or at least one conventional brick and mortar store.

Stored-value cards come in many forms, according to embodiments of the invention. The gift card, like other stored-value cards, can be "re-charged" or "reloaded" at the direction of the original consumer, the gift recipient, or third party. The term "loading on" or "loaded on" herein should be interpreted to include adding to the balance of a financial account or record associated with a stored-value card. The balance associated with the stored-value card declines as the card is used, encouraging repeat visits. The card remains in the user's purse or wallet, serving as an advertisement or reminder to revisit the associated merchant. Gift cards, according to embodiments of the invention, provide a number of advantages to both the consumer and the merchant. Other gift cards and stored-value cards according to embodiments of the invention include loyalty cards, merchandise return cards, electronic gift certificates, employee cards, frequency cards, pre-paid cards, and other types of cards associated with or representing purchasing power or monetary value, for example.

Although the invention has been described with respect to particular embodiments, such embodiments are for illustrative purposes only and should not be considered to limit the invention. Various alternatives and changes will be apparent to those of ordinary skill in the art. Other modifications within the scope of the invention and its various embodiments will be apparent to those of skill in the art.

What is claimed is:

1. A stored-value card comprising:
   a housing defining a storage cavity and including a door and an account identifier signifying a financial account or record linked to the stored-value card, wherein the door is configured to transition between a closed position where the door covers an opening to the storage cavity and an open position where the opening is uncovered; and
   an object stored within the housing and being at least partially removable from the housing when the door is in the open position;
   wherein the object is configured to be moveable between a first position at least partially removed from within the storage cavity and a second position stored within the storage cavity.

2. The stored-value card of claim 1, wherein the door includes a latch mechanism for maintaining the door in a closed position.

3. A stored-value card comprising:
   a housing defining a storage cavity and including a door and an account identifier signifying a financial account or record linked to the stored-value card, wherein the door is configured to transition between a closed position where the door covers an opening to the storage cavity and an open position where the opening is uncovered; and
   an object stored within the housing and being at least partially removable from the housing when the door is in the open position;
   wherein the object includes a toy.

4. The stored-value card of claim 3, wherein the toy includes an elastomeric and elongated appendage having a sticky surface.

5. The stored-value card of claim 4, wherein the appendage defines a first end and a second end opposite the first end, the first end being coupled to the housing.

6. A stored-value card comprising:
   a housing defining a storage cavity and including a door and an account identifier signifying a financial account or record linked to the stored-value card, wherein the door is configured to transition between a closed position where the door covers an opening to the storage cavity and an open position where the opening is uncovered; and
   an object stored within the housing and being at least partially removable from the housing when the door is in the open position;
   wherein the object is adapted to be edible.

7. A stored-value card comprising:
   a housing defining a storage cavity and including a door and an account identifier signifying a financial account or record linked to the stored-value card, wherein the door is configured to transition between a closed position where the door covers an opening to the storage cavity and an open position where the opening is uncovered; and
   an object stored within the housing and being at least partially removable from the housing when the door is in the open position;
   wherein the door is rotatably movable between the open position and the closed position.

8. A stored-value card comprising:
   a housing defining a storage cavity and including a door and an account identifier signifying a financial account or record linked to the stored-value card, wherein the door is configured to transition between a closed position where the door covers an opening to the storage cavity and an open position where the opening is uncovered; and
   an object stored within the housing and being at least partially removable from the housing when the door is in the open position;
   wherein the housing further includes:
      a base including the account identifier; and
      a cover member coupled to the base and the door.

9. The stored-value card of claim 7, further comprising:
   a face panel coupled to the cover member and the door to thereby couple the cover member to the door.

10. The stored-value card of claim 8, wherein at least one of the base and the door defines an aperture allowing the toy to partially extend out of the housing when the door is in the closed position.

11. A toy comprising:
    means for elastically deforming and for sticking to target objects; and
    means for substantially enclosing the means for sticking, the means for enclosing including means for linking the toy to a financial account or record such that the toy is a financial transaction card;
    wherein at least a portion of the means for elastically deforming is removable from the means for substantially enclosing.

12. The toy of claim 11, further comprising:
    means for opening and closing the means for substantially enclosing to provide access to the means for elastically deforming.

13. The toy of claim 11, wherein a portion of the means for elastically deforming is secured to the means for substantially enclosing such that less than all of the means for elastically deforming can be removed from the means for substantially enclosing.

14. The toy of claim 11, further comprising means for visually representing the means for sticking as an appendage of one of a character and an animal.

15. The toy of claim 11, wherein the means for sticking comprises means for grasping objects spaced from the housing.

16. A method of encouraging purchase and facilitating use of a financial transaction card linked to a financial account or a financial record, the method comprising:
   displaying a financial transaction card to a potential consumer, the financial transaction card including a rigid enclosure storing an object that is at least partially removable from the enclosure such that the object can be removed from, and replaced within, the enclosure;
   activating the financial transaction card to permit deductions from the financial account or record;
   receiving the financial transaction card as payment for goods or services, the value of the goods or services being deducted from the financial account or the financial record;
   wherein displaying the financial transaction card includes placing the object within the enclosure to be viewable through the enclosure.

17. A gift card assembly comprising:
   a gift card including a picture of an animal or character; and
   a sticky protruding tongue of the animal or character coupled with the gift card.

18. The gift card assembly of claim 17, wherein the tongue is enclosable within the gift card.

* * * * *